United States Patent [19]
Cheung et al.

[11] Patent Number: 5,953,507
[45] Date of Patent: Sep. 14, 1999

[54] METHOD AND APPARATUS FOR PROVIDING A 3-WAY CONNECTION BETWEEN A MOBILE COMPUTING DEVICE, A STATIONARY COMPUTING DEVICE AND A COMPUTER NETWORK

[75] Inventors: Roger Yiu Ming Cheung, Scarborough; Murray Charles Baker, Toronto; David Newton, Concord, all of Canada

[73] Assignee: International Business Machines Corporation, Armonk, N.Y.

[21] Appl. No.: 08/755,422

[22] Filed: Nov. 22, 1996

[30] Foreign Application Priority Data

Jun. 18, 1996 [CA] Canada ................................. 2179349

[51] Int. Cl.⁶ .............................. G06F 13/38; G06F 15/17
[52] U.S. Cl. ................. 395/200.8; 395/200.57; 395/200.66; 370/463
[58] Field of Search ....................... 395/200.3, 200.57, 395/200.66, 200.8; 370/401, 338, 402, 463

[56] References Cited

U.S. PATENT DOCUMENTS

| | | | |
|---|---|---|---|
| 5,159,592 | 10/1992 | Perkins | 370/401 |
| 5,473,608 | 12/1995 | Gagne et al. | 370/401 |
| 5,550,816 | 8/1996 | Hardwick et al. | 370/401 |
| 5,572,528 | 11/1996 | Shuen | 370/402 |
| 5,717,737 | 2/1998 | Doviak et al. | 455/403 |

*Primary Examiner*—Mark H. Rinehart
*Attorney, Agent, or Firm*—Edward H. Duffield

[57] ABSTRACT

A method and apparatus for providing a three-way connection between a mobile computing device, a stationary computing device and a computer network. When there is an established connection between a mobile computing device (e.g. a notebook computer) and the stationary computing device (e.g. desktop PC) over the wireless communication channel (e.g. infrared link), the system operates in BRIDGE mode. In BRIDGE mode the system redirects information packets in the OSI layer 2 (data link layer). When a notebook computer is not attached, the system operates in PASSTHROUGH mode and all non-broadcast message traffic from the Ethernet LAN is filtered by the Ethernet adapter based on the network address or group address of the desktop PC.

18 Claims, 4 Drawing Sheets

METHOD AND APPARATUS FOR PROVIDING A 3-WAY CONNECTION BETWEEN A MOBILE COMPUTING DEVICE, A STATIONARY COMPUTING DEVICE AND A COMPUTER NETWORK

FIELD OF THE INVENTION

The present invention relates to computer networking, and in particular to a method and apparatus for providing a three-way connection between a mobile computing device, a stationary computing device and a computer network.

BACKGROUND OF THE INVENTION

Local area networks (LAN's) have historically consisted of nodes interconnected by physical telecommunications media (e.g. coaxial cable, twisted pair wire or fibre optics).

Recently wireless LAN's, the nodes of which are not connected by means of a physical medium, have started to appear in the art. These wireless LAN's communicate by means of an infrared (IR), radio or other signals. One of the benefits of using wireless LAN's is that cabling is not required. This is particularly useful for mobile nodes such as laptop and notebook computers, PDA's (Personal Digital Assistant), and the like. If appropriately equipped with a suitable wireless adapter (which includes a transmitter/receiver and control card), such as an IR wireless adapter, the mobile nodes can move around and remain connected to the network, provided they do not move out of range for the IR adapter.

To accomplish a simultaneous three-way connection between a notebook PC, a desktop PC and a LAN, there are two possible approaches. The first approach involves using a router. The Network Operating System (NOS) of the desktop PC is provided with a built-in router program and connected to the Network Operating System (NOS) on the LAN. The NOS of the notebook PC is connected to the router within the desktop PC NOS. Data in the form of information packets from the NOS of the notebook PC destined for either the NOS of the desktop PC or the NOS's on the LAN is first received by the router program on the NOS of the desktop PC. Based on the destination information contained in the data packet, the router will either send the data packet to the NOS of the desktop PC or to NOS's on the LAN.

The second approach is that of the present invention and involves using a three-way bridge. The NOS of the desktop PC is directly connected to the three-way bridge program on the desktop PC. The NOS of the notebook PC is directly connected to the same three-way bridge program. The NOS's on the LAN are also directly connected to the same three-way bridge program.

The main difference between the router and the three-way bridge is that the router redirects data in the OSI (Open System Interconnection Standard) layer 3, i.e. the network layer, and the three-way bridge redirects data in the OSI layer 2, i.e. the data link layer.

The three-way bridge is preferred in a specific environment having only one notebook PC, one desktop PC, and a LAN. The three-way bridge is preferred over a router due to its simplicity in setting up the connections, operation by the end-use, and the ease of implementation.

SUMMARY OF THE INVENTION

The present invention provides a method and apparatus for providing a three-way bridge or mobile support means or program (MSP) for coupling a mobile PC to a desktop PC and a wired computer network.

According to one aspect of the invention, the three-way bridge comprises a program running on the desktop PC that appears as a LAN hardware adapter device driver to the Network Operating System (NOS) of the desktop PC. The desktop PC NOS assumes it is communicating with the LAN hardware adapter directly.

The three-way bridge according to the present invention runs on top of both the device driver for the wireless interface adapter and the device driver for the LAN adapter. The three-way bridge appears as a NOS to both the wireless interface adapter and the LAN hardware adapter. When all the connections between the notebook PC, the desktop PC, and the LAN are active simultaneously, the three-way bridge according to the present invention puts both the wireless adapter and the LAN adapter into a promiscuous mode. During initialization, the three-way bridge will discover the node address of the LAN hardware adapter. This address is used by the NOS on the desktop PC. To discover the node address of the notebook PC NOS, the three-way bridge program examines the first data that is originated from the notebook PC. The program checks the source address and the OSI (Open System Interconnection Standard) layer 2 data link layer to determine the node address of the NOS for the notebook PC.

In operation, all traffic originating from the NOS of the notebook PC is received by the three-way bridge program. The three-way bridge program checks the destination address in the OSI layer 2 (i.e. the data link layer) to determine if the data is destined for the NOS of the desktop PC. If the data is destined for the desktop PC NOS, the data is delivered to the desktop PC NOS as though it came from the LAN. If the data is intended for both the desktop PC and the LAN, e.g. broadcast frames, the data is sent to the LAN in addition to the desktop PC. If the data is intended for the LAN, the data is sent on to the LAN.

It is a feature of the three-way bridge program that all traffic on the LAN is examined. The three-way bridge program checks the destination address in the OSI layer 2, i.e. the data link layer, to determine if the data is destined for the desktop PC NOS or the notebook PC NOS, or both. If the data is not destined to the desktop PC NOS or the notebook PC NOS, the three-way bridge program takes no further action. If the data is destined to the desktop PC NOS or the notebook PC NOS, or both, the three-way bridge program, depending on the destination address, sends the data either to the desktop PC NOS or the notebook PC NOS, or both.

The traffic originating from the desktop PC NOS is also examined by the three-way bridge program. The bridge program checks the destination address in the OSI layer 2 data link layer to determine if the data is destined for the notebook PC NOS or NOS's on the LAN, or both. If the data is destined for the notebook PC NOS only, the bridge program sends the data to the notebook PC. On the other hand, if the data is destined for the NOS's on the LAN, the three-way bridge program sends the data on to the LAN. If the data is destined for both the notebook PC NOS and the NOS's on the LAN, the program sends the data to both the notebook PC as well as the NOS's on the LAN.

In a further enhancement, the three-way bridge program according to the present invention will re-program the LAN adapter to take it out of promiscuous mode and put it back into normal mode with the original node address in order to obtain optimal performance when the notebook PC is not connected to the desktop PC. In normal mode, the LAN adapter hardware will filter out all the data that is not directed to the node address. In this situation, the three-way bridge program does not need to spend CPU cycles to perform the filtering. The desktop PC with the three-way bridge program should perform as well as one without the three-way bridge program.

In a first aspect, the present invention provides an apparatus for providing a three-way connection between a computer network, a stationary computing device, and a mobile computing device, said apparatus comprising: (a) network interface means for interfacing to said computer network; (b) a network operating system on said stationary computing device and including means for processing information packets for and from said computer network; (c) communication interface means for communicating between said stationary computing device and said mobile computing device and including control means for transmitting and receiving information packets between said stationary computing device and said mobile computing device; (d) routing means for routing information packets between said computer network, said stationary computing device, and said mobile computing device, said routing means including detector means for detecting connection of a mobile computing device to said communication interface means, and having redirector means responsive to a connection to said mobile computing device for redirecting information packets between said computer network, said stationary computing device and said mobile computing device.

In a second aspect of the present invention, there is provided a method for providing a three-way connection for transferring information packets between a stationary computing device, a mobile computing device, and a network, said stationary computing device being coupled to said network through a network adapter, and said mobile computing device utilizing a wireless communication channel for transferring information packets to said stationary computing device, said method comprising the steps of: (a) determining if said mobile computing device is coupled to said stationary computing device via said wireless communication channel; (b) redirecting information packets originating from said mobile computing device and destined for said network through said stationary computing device when said wireless communication channel is active as determined in step (a); (c) redirecting information packets originating from said network and destined for said mobile computing device through said stationary computing device when said wireless communication channel is active as determined in step (a).

In another aspect of the present invention, there is provided a computer program product for use in a computer system comprising a stationary computing device, a mobile computing device and a network, said stationary computing device being coupled to said network and having a network operating system, and said mobile computing device utilizing a wireless communication channel for transferring information packets to said stationary computing device, said computer program product comprising: a recording medium; means recorded on said medium for instructing said stationary computing device to perform the steps of: (a) determining if said mobile computing device is coupled to said stationary computing device via said wireless communication channel; (b) redirecting information packets originating from said mobile computing device and destined for said network through said stationary computing device when said wireless communication channel is active as determined in step (a); (c) redirecting information packets originating from said network and destined for said mobile computing device through said stationary computing device when said wireless communication channel is active as determined in step (a).

BRIEF DESCRIPTION OF THE DRAWINGS

Reference will now be made to the accompanying drawings which show, by way of example, a preferred embodiment of the present invention, and in which.

DETAILED DESCRIPTION OF THE PREFERRED EMBODIMENT

The present invention provides a method and means for connecting a mobile or portable personal computer, referred to as a mobile PC, to a stationary or desktop PC. The desktop PC is coupled to a wired computer network.

Figure 5:
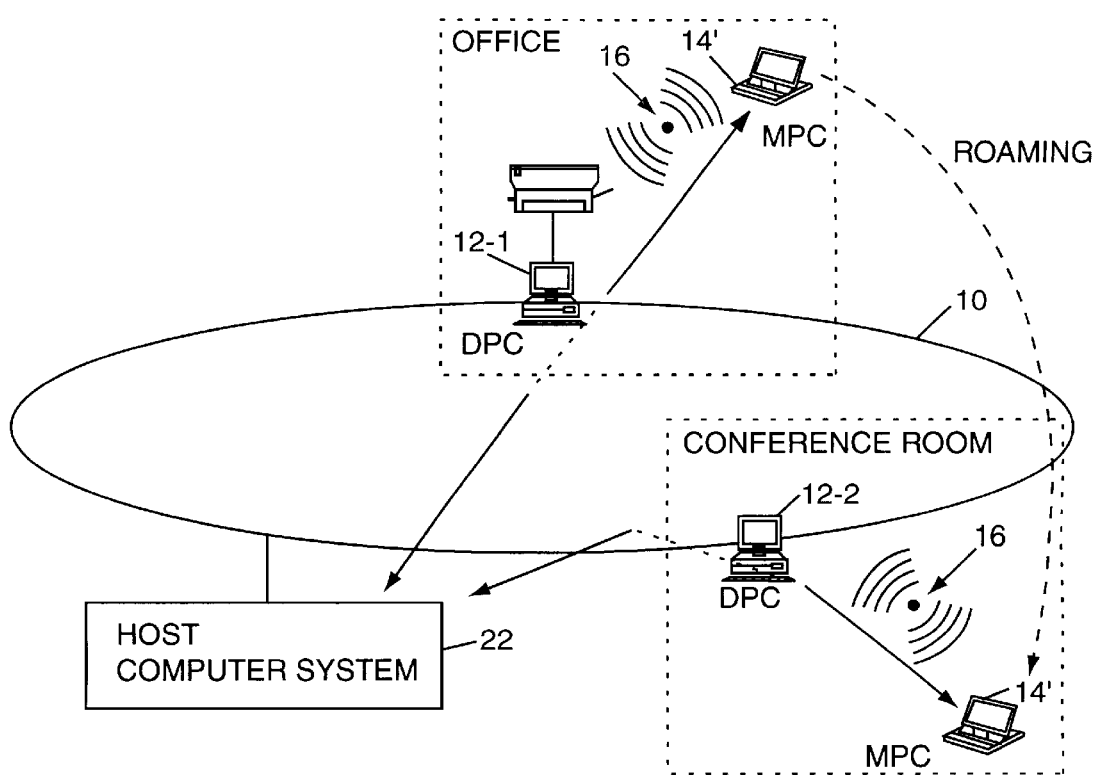
FIG. 5 shows in schematic form another configuration for allowing a mobile PC to roam between desktop PC's utilizing the mobile support program according to the present invention.

In the drawings, the wired computer network is denoted by reference 10, the desktop PC is denoted by reference 12, referred to individually as 12-1 and 12-2 in FIG. 5, and the mobile PC is denoted by reference 14. The mobile PC is described as a notebook or laptop computer, but may comprise other mobile computing devices, such as, a personal digital assistant (PDA), a personal communication assistant (PCA), an electronic organizer or a two-way interactive TV/set-top box remote control. In the described system, the wired computer network 10 comprises a Local Area Network or LAN and is referred to as a wired LAN. It is, however, to be understood that other types of wired computer networks are possible, for example, including an ATM network or a cable TV network.

Data transmission over the LAN 10 is performed according to well defined and internationally accepted protocol standards. In the present description, the LAN 10 is described (but not limited) in relation to known communication protocol according to the Ethernet standard as will be within the understanding of those skilled in the art. Other protocols, such as, token ring, are also applicable and within the understanding of those skilled in the art.

As will be familiar to those skilled in the art, an Ethernet frame, i.e. information packet, according to the MAC-layer (Medium Access Control) protocol comprises 7 bytes preamble, 1 byte frame delimiter, 6 bytes of information representing the source address, that is, the address of the originating or transmitting node, for the information packet, 6 bytes of information representing the destination address for the information packet, 2 bytes for packet length/type, 46 to 1500 bytes of data, and 4 bytes FCS. The arrangement of the various bits of information within the MAC-layer header has been standardized and is well-known to those skilled in the art.

Figure 2:
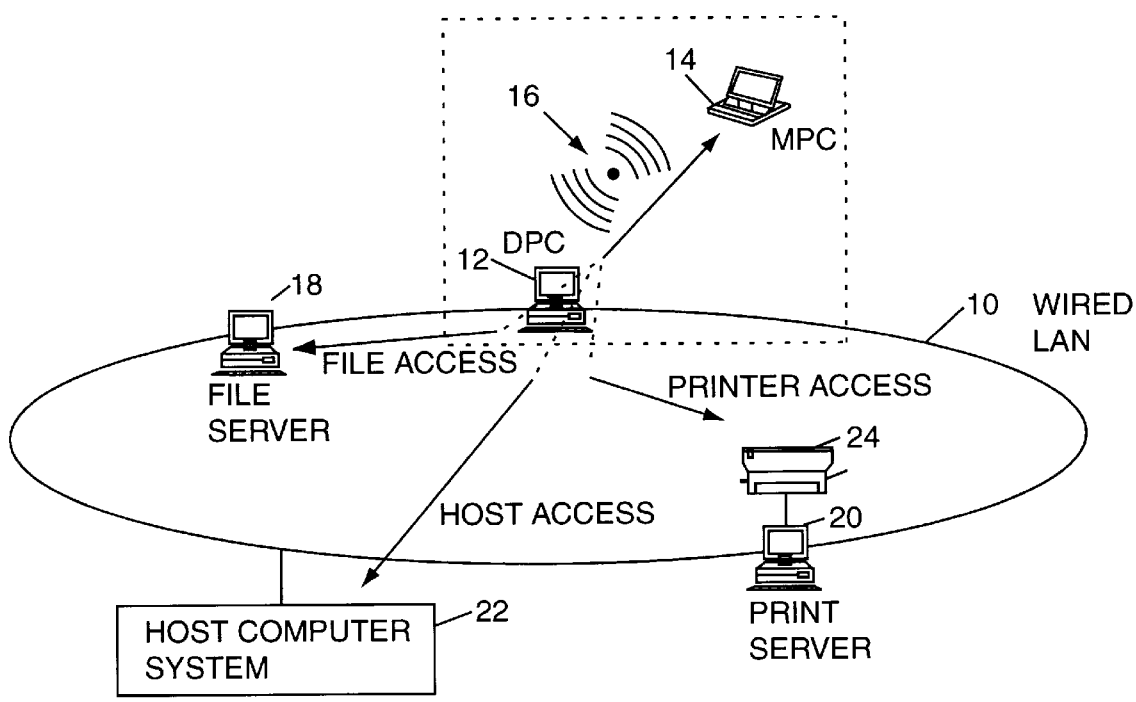
FIG. 2 shows in schematic form a configuration for providing a mobile PC with access to a wired computer network utilizing the mobile support program according to the present invention.

As shown in FIG. 2, the mobile PC 14 is coupled to the desktop PC 12 through a wireless communication channel 16. In the described system, the wireless communication channel 16 comprises an infrared communication channel, although it is understood that other types of wireless communication links are possible. The implementation of the infrared channel 16 is within the understanding of those skilled in the art using, for example, conventional IrDA chipsets, such as the IBM1502 IR controller chip from IBM Corp., or the NSC108IR controller chip from National Semiconductor Corp.

In the description that follows, the following definitions are used. Local area network (LAN) is a network that is usually confined to a small geographical area, e.g. within a building. IR WLAN is a wireless LAN, i.e. WLAN, that uses infrared light as the communication medium. Mobile personal computer (MPC) means any mobile device that has a IrDA 1.1 compatible infrared device. Desktop personal computer (DPC) means any desktop device that has an IrDA 1.1 compatible infrared device. Access point (AP) means a device that connects a mobile PC to a wired LAN using a wireless infrared connection between the access point and the mobile PC. Bridge means a bridge that operates at the OSI data link layer (i.e. layer 2) and copies frames from one network to the other. The bridge often contains logic to copy only a subset of the frames it receives. This logic is known as filtering. A bridge is usually measured by its filtering rate and forwarding rate.

The wired LAN 10 includes connections or nodes for other terminals comprising a file server 18, a print server 20, and a host computer system 22. The file server 18, print server 20 and host computer 22 provide resources which can be shared between the mobile PC 14, the desktop PC 12 and other stations (e.g. mobile or desktop PC's) connected to the LAN 10. The file server 18 includes mass storage devices (not shown) for providing file archival and retrieval. As shown in FIG. 2 (and FIG. 4), the print server 20 includes a printer 24 for providing a printing resource for the network 10.

The method and means according to the present invention allows a mobile PC 14 to connect to an Ethernet wired LAN 10 via an existing desktop PC 12, thereby eliminating the need to purchase an additional access point (AP) or station box (not shown) for the mobile PC 14. In this mode, the mobile PC 14 is provided with access to the resources, e.g. file server 18 or the printer 24 on the network 10. The user of the mobile PC 14 may require access to the Ethernet wired LAN 10 for the host computer 22, the file server 18, the printer 24, etc. According to the present invention, the user can accomplish the connection via the desktop PC 12 using the wireless infra-red communication link 16 between the mobile PC 14 and the desktop PC 12.

Figure 3:
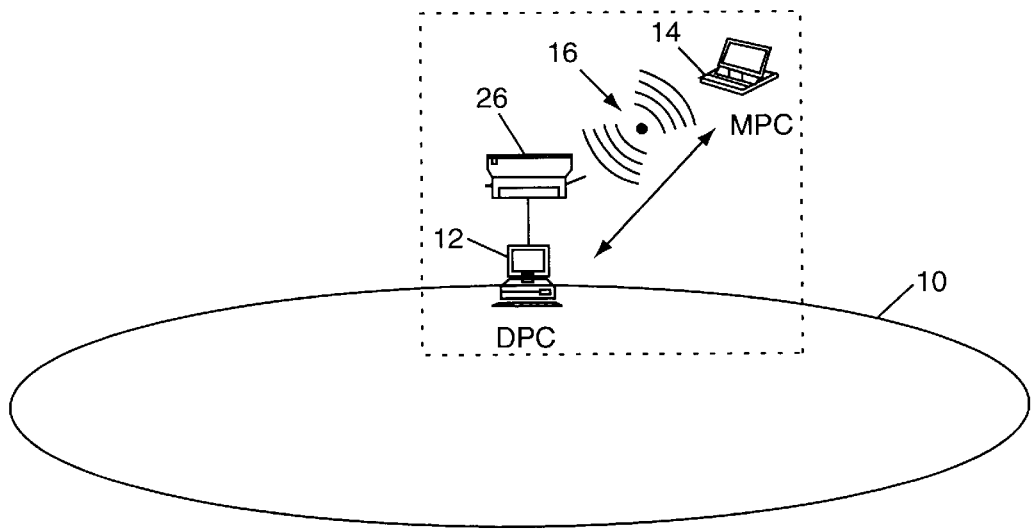
FIG. 3 shows in schematic form another configuration for integrating a mobile PC with a desktop PC.

In another aspect, the present method allows the mobile PC 14 to connect to the desktop PC 12 to provide the mobile PC 14 with access to the resources of the desktop PC 12, for example, a printer 26 as shown in FIG. 3 or a mass storage device. This feature is particularly useful to provide a connection between the mobile PC 14 and the desktop PC 12 in order to synchronize files and/or databases.

In another aspect, the method according to the present invention allows the desktop PC 12 to remain connected to the wired LAN 10 while the mobile PC 14 accesses the network 10 through the desktop PC 12. This aspect is depicted in FIG. 2.

Figure 4:
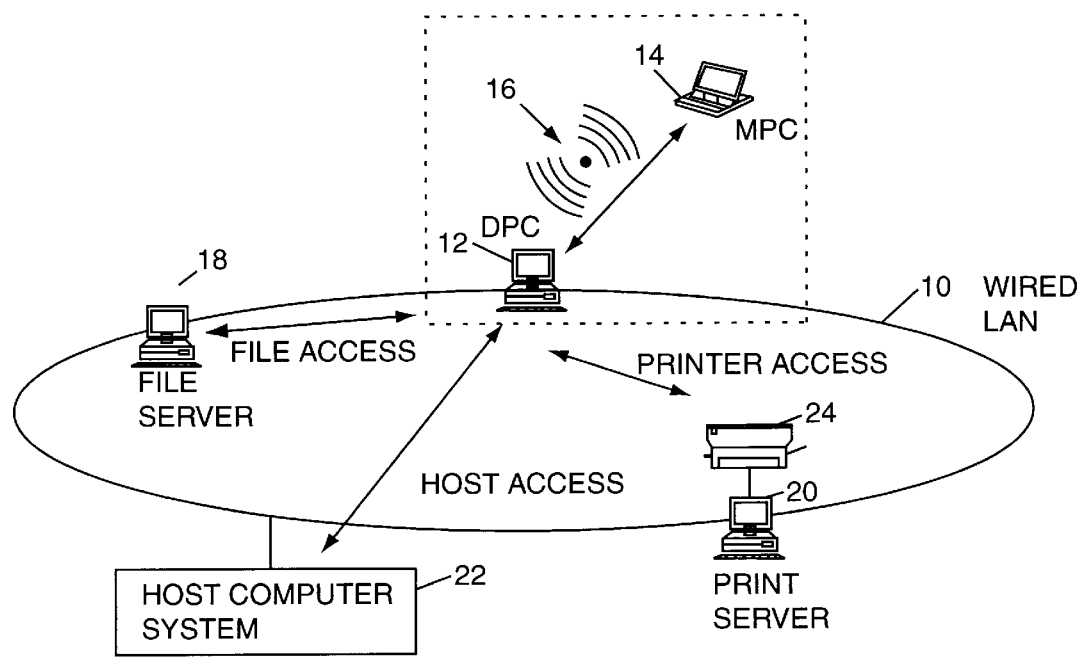
FIG. 4 shows in schematic form another configuration for providing a desktop PC with access to a wired computer network utilizing the mobile support program.

In another aspect, the method according to the present invention allows the mobile PC 14 to roam between desktop PC's 12-1 and 12-2 located on the same Ethernet LAN segment as illustrated in FIG. 5. This mode of operation and the others shown in FIGS. 2 to 4 are described in more detail below.

Figure 1:
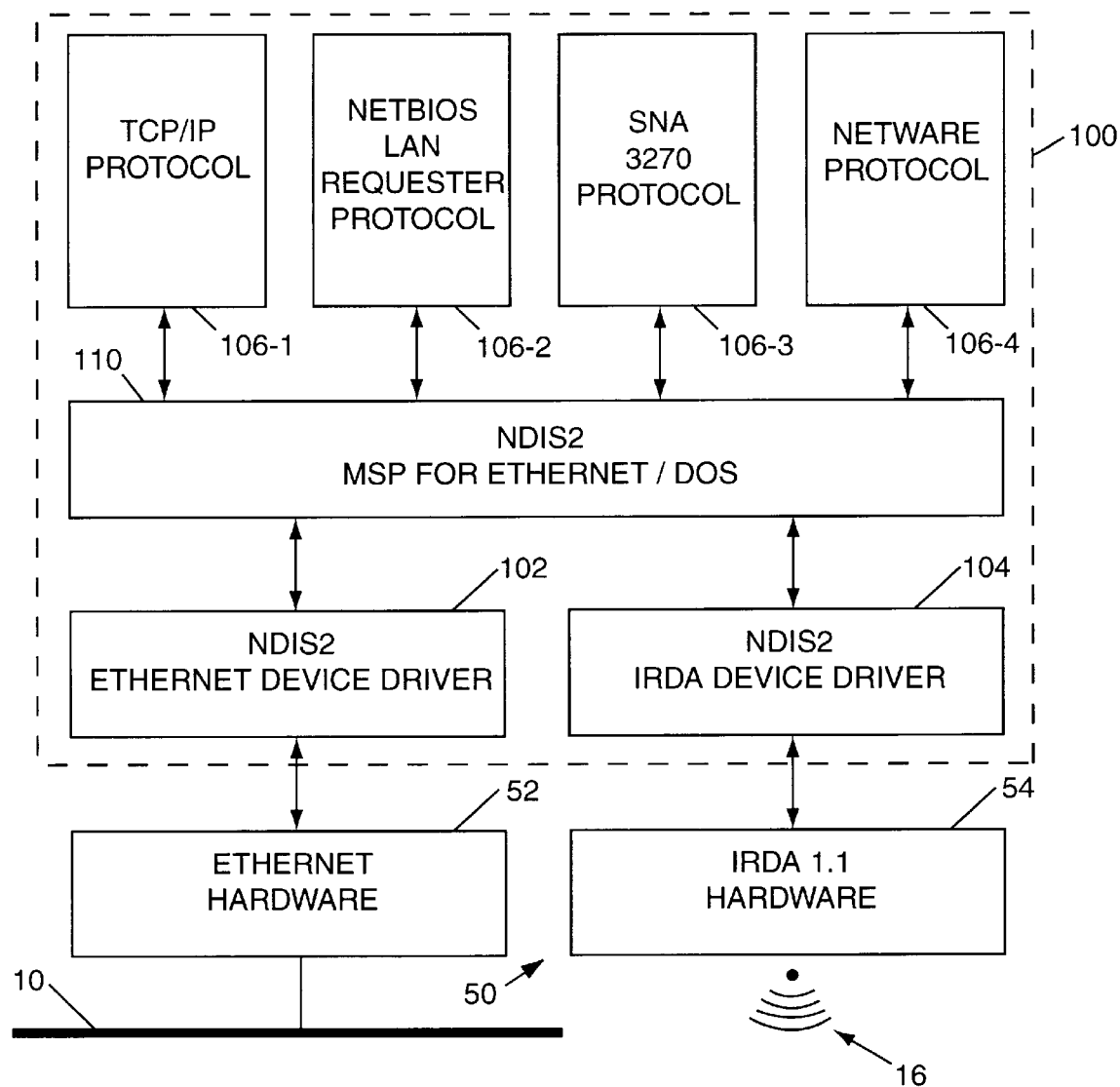
FIG. 1 shows in block diagram form a mobile support program according to the present invention.

Reference is made to FIG. 1 which shows in block diagram form an implementation for the method and means according to the present invention. The method and means are embodied in computer software denoted generally by 100 and computer hardware 50 which runs on the desktop PC 12. The software 100 runs the hardware 50 which couples the desktop PC 12 to the Ethernet LAN 10 and the wireless communication channel 16. The computer software 100 comprises the workstation software for the Network Operating System or NOS.

The hardware 50 comprises a network adapter 52 and a wireless adapter 54. For an Ethernet based configuration, the network adapter 52 comprises suitable Ethernet hardware which is coupled to the Ethernet LAN 10. For an infrared communication channel 16, the wireless adapter 54 comprises IrDA 1.1 hardware as will be familiar to one skilled in the art. The mobile PC 14 has a corresponding IrDA controller and device driver (not shown) for implementing the communication channel 16.

As shown in FIG. 1, the workstation software 100 includes an Ethernet device driver 102 and an IrDA device driver 104. The Ethernet device driver 102 interfaces the workstation software 100 to the Ethernet adapter 52 and the IrDA device driver 104 interfaces the workstation 100 to the IrDA 1.1 adapter 54. In known manner, the Ethernet device driver 102 provides the workstation software 100 with the capability to work with the specific Ethernet adapter 52 and perform data transmission on the LAN 10. Similarly, the IrDA device driver 104 allows the workstation software to transmit and receive information packets over the wireless communication channel 16 through the IrDA adapter 54. In the described embodiment, each adapter 52, 54 comprises a NDIS type driver as will be understood by those skilled in the art.

Referring to FIG. 1, the workstation software 100 preferably includes upper layer protocol stacks 106 which support communication protocols for known Network Operating Systems (NOS). There is provided an upper layer protocol stack 106-1 for TCP/IP (Transmission Control Protocol/Internet Protocol) 106, an upper layer protocol stack 106-2 for NETBIOS LAN Requester, an upper layer protocol stack 106-3 for SNA 3270, and an upper layer protocol stack 106-4 for NETWARE™ 112. The upper layer protocol stacks 106 comprise software which will be well understood by one skilled in the art.

According to the invention, workstation software 100 includes another device driver 110. As shown in FIG. 1, the device driver 110 binds itself to the upper layer protocol stack 106. The device driver 110 also binds itself to the Ethernet device driver 102 and the IrDA device driver 104.

The device driver 110 is implemented to mimic the behaviour of a NDIS2 device driver in the described embodiment. According to the invention, the device driver 110 takes on two personas. First, the device driver 110 appears to the upper layer protocol stack 106, e.g. TCP/IP 106-1, as an Ethernet NDIS2 device driver. On the other hand, for Ethernet device driver 102 and the IrDA device driver 104, the device driver 110 appears as an upper layer protocol stack 106.

The device driver 110 according to the present invention operates in two modes: BRIDGE mode and PASSTHROUGH mode. The mode of operation depends on whether the mobile PC 14 has established a wireless infrared connection with the desktop PC 12. The device driver 110 determines if a connection has been established by querying the MAC (Medium Access Control) statistics for the IrDA device driver 104. A specific field in the MAC statistics for the IrDA driver 104 serves to indicate whether an IrDA connection over the channel 16 exists.

If there is an established connection over the wireless, i.e. infrared, communication channel 16 between the mobile PC 14 and the desktop PC 12, the device driver 110 operates in BRIDGE mode. In BRIDGE mode, the device driver 110 functions as an Ethernet transparent MAC-bridge that connects the mobile PC 14 to the Ethernet wired LAN 10 via the desktop PC 12. The device driver 110 also acts as an Ethernet transparent MAC-bridge that connects the desktop PC 12 to the Ethernet wired LAN 10.

In the BRIDGE mode of operation, the device driver 110 puts both the Ethernet adapter 52 and the IrDA adapter 54 into "promiscuous" mode. In promiscuous mode, the adapters 52, 54 receive all information packets regardless of the destination address. In BRIDGE mode, the device driver 110 resends on the Ethernet LAN 10 any IR message received from the mobile PC 14 which is destined for a wired node, e.g. to the file server 18. On the other hand, an IR information packet received from the mobile PC 14 and intended for the desktop PC 12 is forwarded by the device driver 110 to the upper layer protocol stack 106 that is bound to the device driver 110.

Information packets originating from the desktop PC 12 are handled as follows by the device driver 110 in BRIDGE mode. The device driver 110 sends any information packets destined for a wired node, e.g. print server 20, on the LAN 10 and the packets are sent on the LAN 10 by the device driver 110 via the Ethernet device driver 102. Any information packet from the desktop PC 12 destined for the mobile PC 14 is sent by the device driver 110 on the wireless communication channel 16 via the IrDA device driver 104.

Information packets originating from the Ethernet LAN 10 are routed by the device driver 110 as follows in BRIDGE mode. Any information packet received from the Ethernet LAN 10 and destined for the desktop PC 12 is forwarded by the device driver 110 to the upper layer protocol stack 106 that is binded to the device driver 110 (provided such a stack exists). An information packet received from the LAN 10 and destined to the mobile PC 14 is resent by the device driver 110 on the wireless communication channel 16 via the IrDA adapter 54.

It will be appreciated that the device driver according to the present invention is not a standard-compliant ethernet MAC-bridge implementation. Rather, the primary function of the device driver 110 according to the present invention is to create a three-way connection between the Ethernet LAN 10, the desktop PC 12, and the mobile PC 14.

The device driver 110 operates in PASSTHROUGH mode when there is no mobile PC 14 connected to the desktop PC 12. In the PASSTHROUGH mode of operation, the device driver 110 puts the Ethernet adapter 52 back into NORMAL mode, i.e. to the preset universal or assigned network address and group address. The device driver 110 however keeps the IrDA adapter 54 in promiscuous mode.

In PASSTHROUGH mode, the Ethernet adapter 52 filters out all non-broadcast message traffic from the Ethernet LAN 10 that is not destined for its network address or group address. The device driver 110 passes all data packets received from the Ethernet adapter 52 to the upper layer protocol stack 116. In PASSTHROUGH mode, the device driver 110 does not examine or act on the data except for the following commands from the upper layer protocol stack: (1) Open_Adapter; (2) Close_Adapter; (3) Set_Station_Address; (4) Add_Multicast_Address; (5) Delete_Multicast_Address.

The device driver 110 is configured not to pass the Open_Adapter command to the Ethernet hardware adapter 52. Instead, the device driver 110 returns an "Okay" indication to the upper layer protocol stack 106. Similarly, the device driver 110 does not pass the Close_Adapter command to the Ethernet adapter 54. Instead, the device driver 110 returns an Okay indication to the upper layer protocol stack 106.

The device driver 110 processes the Set_Station_Address command according to its mode of operation. In BRIDGE mode, the device driver 110 does not pass the Set_Station_Address command to the Ethernet adapter 52. Instead, the device driver 110 stores the station_address in memory and returns an Okay indication to the upper protocol stack 106. When the device driver 110 switches to PASSTHROUGH mode, it sets the Ethernet adapter 52 based on the station_address. In PASSTHROUGH mode, the device driver 110 passes the Set_Station_Address command to the Ethernet adapter 52. The device driver 110 also stores the station_address in memory. If the indication from the Ethernet adapter 52 is not okay, the device driver 110 deletes the station_address from its memory.

The device driver 110 processes the Add_Multicast_Address command differently depending on its mode of operation. In BRIDGE mode, the device driver 110 does not pass the Add_Multicast_Address command to the Ethernet adapter 52. Instead, the device driver 110 stores the multicast_address in memory and returns an Okay indication to the Ethernet adapter 52. When the device driver 110 switches to PASSTHROUGH mode, the device driver 110 sets the Ethernet adapter 52 based on the multicast_address. In PASSTHROUGH mode, the device driver 110 passes the Add_Multicast_Address command to the Ethernet adapter 52. The device driver 110 also stores the multicast_address in memory. If the indication received from the Ethernet adapter 52 is not ok, the device driver 110 deletes the multicast_address from memory.

Processing of the Delete_Multicast_Address also depends on the mode of operation for the device driver 110. In BRIDGE mode, the device driver 110 does not pass the Delete_Multicast_Address command to the Ethernet adapter 52. Instead, the device driver 110 deletes the multicast_address in memory and returns an Okay indication to the Ethernet adapter 52. In PASSTHROUGH mode, the device driver 110 passes the Delete_Multicast_Address command to the Ethernet adapter 52. If the indication from the Ethernet adapter 52 is okay, the device driver 110 deletes the multicast_address from its memory.

In another aspect, the device driver 110 provides roaming support. When the device driver 110 receives the first message from a mobile PC 14 after a new infrared connection has been established on the communication link 16, the device driver 110 stores the network_address of the mobile PC 14 in memory.

In some situations, the device driver 110 will lose network data packets from the desktop PC 12 in the Ethernet wired LAN 10 to the mobile PC 14, for example, if the mobile PC 14 roams from one desktop PC 12-1 to another desktop PC 12-2 as illustrated in FIG. 5. However, the device driver 110 will not cause duplication in the transmission or reception of network data packets. If network data packets are lost, the recovery is performed by the upper layer protocol(s) 106.

It is a feature of the present invention that the IrDA NDIS2 device 104 is modified to include a new entry in the MAC statistics to indicate whether an infrared connection has been established on the communication channel 16. The device driver 110 uses the MAC entry to determine if a mobile PC 14 is connected to the desktop PC 12.

Since the IrDA adapter 54 will have a lower data transfer rate (4 MBPS or lower) than the Ethernet adapter 52 (10 MBPS), preferably the IrDA adapter 54 will have a higher priority than the Ethernet adapter 52 for handling hardware interrupts. In other words, the IrDA adapter 54 should occupy a lower interrupt level than the Ethernet adapter 52, as will be understood by those skilled in the art. Furthermore, the implementation of the device driver 110 will depend on the availability of both the Ethernet NDIS2 device driver 102 and the IrDA NDIS2 device driver 104 for the desktop PC 12. The device driver 110 also depends on the availability of either the IrDA NDIS2 device driver 104 or the IrDA device driver (not shown) on the mobile PC 14.

Summarizing, the present invention provides a method and means for a three-way bridge which is suitable for known network protocols, such as, TCP/IP, NetBios, Netware™, and SNA. When there is an established connection between a mobile computing device (e.g. a notebook computer) and the stationary computing device (e.g. desktop PC) over the wireless communication channel (e.g. infrared link), the system operates in BRIDGE mode. In BRIDGE mode the system redirects information packets in the OSI layer 2 (data link layer). When a notebook computer is not attached, the system operates in PASSTHROUGH mode and all non-broadcast message traffic from the Ethernet LAN is filtered by the Ethernet adapter based on the network address or group address of the desktop PC.

The present invention may be embodied in other specific forms without departing from the spirit or central characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The embodiments of the invention in which an exclusive property or privilege are defined as follows:

1. Apparatus for providing a three-way connection between a computer network, a stationary computing device, and a mobile computing device, said apparatus comprising:
   (a) network interface means for interfacing said stationary computer to said computer network;
   (b) a network operating system on said stationary computing device and including means for processing information packets for and from said computer network;
   (c) communication interface means for communicating between said stationary computing device and said mobile computing device and including control means for transmitting and receiving information packets between said stationary computing device and said mobile computing device;
   (d) routing means for routing information packets between said computer network, said stationary computing device, and said mobile computing device, said routing means including detector means for detecting connection of a mobile computing device to said communication interface means, and having redirector means responsive to a connection to said mobile computing device for redirecting information packets in the Open System Interconnection standard (OSI), Data Link Layer, Layer 2 between said computer network, said stationary computing device and said mobile computing device using said Data Link Layer.

2. The apparatus as claimed in claim 1, wherein said routing means operates in passthrough mode and bridge mode, and said routing means having means for selecting bridge mode in response to a mobile computing device being connected to said stationary computing device.

3. The apparatus as claimed in claim 2, wherein said routing means provides in bridge mode a three-way connection between said computer network, said stationary computing device, and said mobile computing device.

4. The apparatus as claimed in claim 3, wherein said communication interface means comprises a wireless adapter and said control means comprises a device driver compatible with said wireless adapter, and said device driver including means for interfacing to said routing means.

5. The apparatus as claimed in claim 3, wherein said network interface means comprises a network adapter and said means for processing information packets comprises a device driver compatible with said network adapter, and said device driver including means for interfacing to said routing means.

6. The apparatus as claimed in claim 4, wherein said wireless adapter comprises an infrared adapter and said device driver comprises a Network Driver Interface Specification (NDIS) conforming driver.

7. The apparatus as claimed in claim 5, wherein said network operating system includes an upper protocol stack, and said upper protocol stack having means for interfacing to said routing means.

8. The apparatus as claimed in claim 5 or 7, wherein said network adapter comprises an Ethernet adapter and said device driver comprises a NDIS Ethernet driver.

9. The apparatus as claimed in claim 6, wherein said infrared adapter is an IrDA hardware adapter.

10. The apparatus as claimed in claim 1, wherein said routing means includes control means responsive to a non-active connection between said mobile computing device and said stationary computing device for operating said network interface means in filtering mode.

11. A method for providing a three-way connection for transferring information packets between a stationary computing device, a mobile computing device, and a network, said stationary computing device being coupled to said network through a network adapter, and said mobile computing device utilizing a wireless communication channel for transferring information packets to said stationary computing device, said method comprising the steps of:
   (a) determining if said mobile computing device is coupled to said stationary computing device via said wireless communication channel;
   (b) redirecting information packets originating from said mobile computing device and destined for said network through said stationary computing device using the OSI Standard Layer 2 Data Link Layer when said wireless communication channel is active as determined in step (a);
   (c) redirecting information packets originating from said network and destined for said mobile computing device through said stationary computing device using the OSI Standard Layer 2 Data Link Layer when said wireless communication channel is active as determined in step (a).

12. The method as claimed in claim 11, further including the step of directing information packets originating from said network to said stationary computing device when said wireless communication channel is inactive.

13. The method as claimed in claim 12, wherein said step of directing information packets is performed by said network adapter and comprises filtering information packets destined for said stationary computing device.

14. The method as claimed in claim 11, wherein said steps (b) and (c) of redirecting comprises scrutinizing information packets on said network and selecting information packets destined for said mobile computing device.

15. A computer program product for use in a computer system comprising a stationary computing device, a mobile computing device and a network, said stationary computing device being coupled to said network and having a network operating system, and said mobile computing device utilizing a wireless communication channel for transferring information packets to said stationary computing device, said computer program product comprising:

a recording medium;

means recorded on said medium for instructing said stationary computing device to perform the steps of:
(a) determining if said mobile computing device is coupled to said stationary computing device via said wireless communication channel;
(b) redirecting information packets originating from said mobile computing device and destined for said network through said stationary computing device using the OSI Standard Layer 2 Data Link Layer when said wireless communication channel is active as determined in step (a);
(c) redirecting information packets originating from said network and destined for said mobile computing device through said stationary computing device using the OSI Standard Layer 2 Data Link Layer when said wireless communication channel is active as determined in step (a).

16. The computer program product as claimed in claim 15, further including the step of directing information packets originating from said network to said stationary computing device when said wireless communication channel is inactive.

17. The computer program product as claimed in claim 16, wherein said step of directing information packets is performed by said network adapter and comprises filtering information packets destined for said stationary computing device.

18. The computer program product as claimed in claim 15, wherein said steps (b) and (c) of redirecting comprises scrutinizing information packets on said network and selecting information packets destined for said mobile computing device.

* * * * *